Jan. 1, 1924

C. B. FULLER, JR 1,479,464

PROCESS AND APPARATUS FOR BLANKING ARTICLES FROM SHEET MATERIAL

Filed June 26, 1922    3 Sheets-Sheet 1

Inventor
Clarence B. Fuller Jr.
by James R. Hodder
att'y.

Jan. 1, 1924. 1,479,464
C. B. FULLER, JR
PROCESS AND APPARATUS FOR BLANKING ARTICLES FROM SHEET MATERIAL
Filed June 26, 1922 3 Sheets-Sheet 2
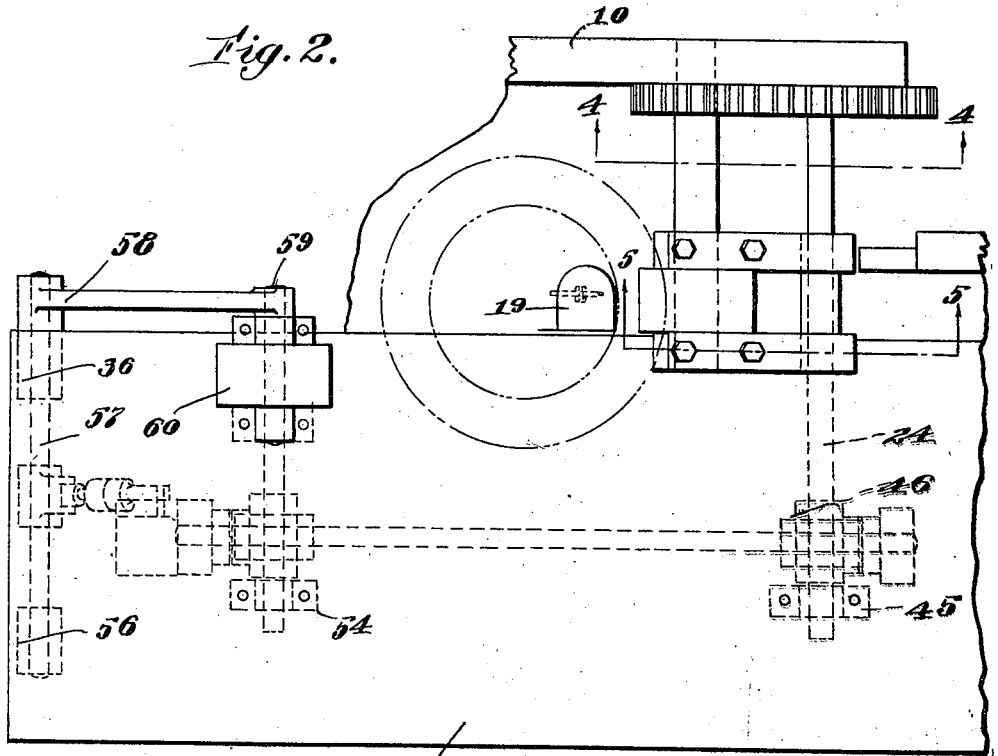
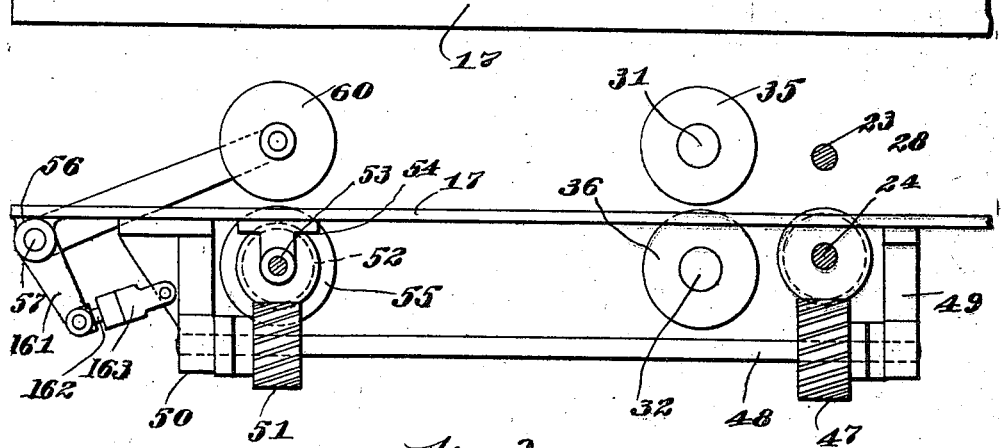
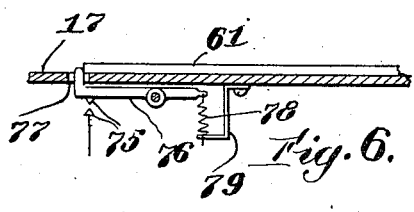
Inventor
Clarence B. Fuller Jr.
by James R. Hodder
Att'y.

Jan. 1, 1924 1,479,464
C. B. FULLER, JR
PROCESS AND APPARATUS FOR BLANKING ARTICLES FROM SHEET MATERIAL
Filed June 26, 1922 3 Sheets-Sheet 3
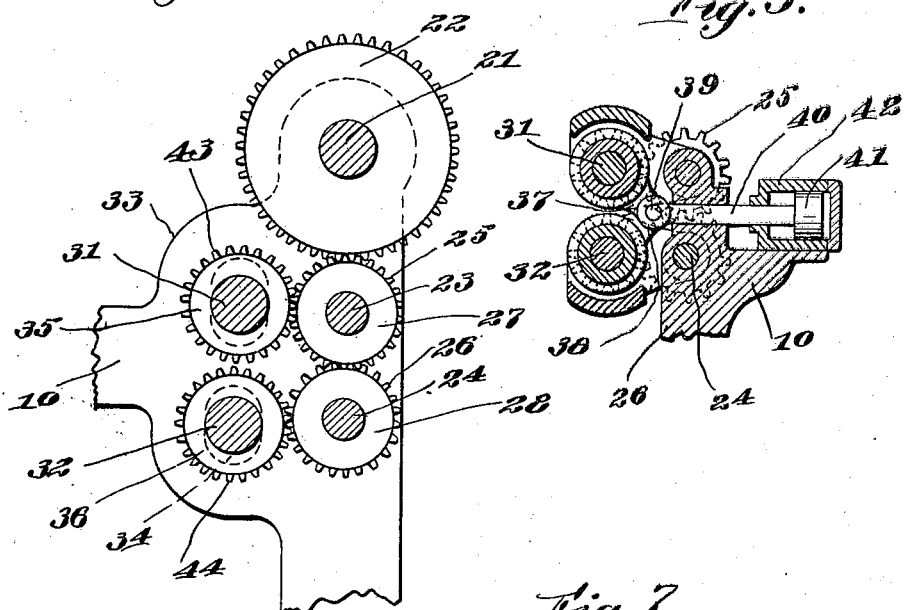
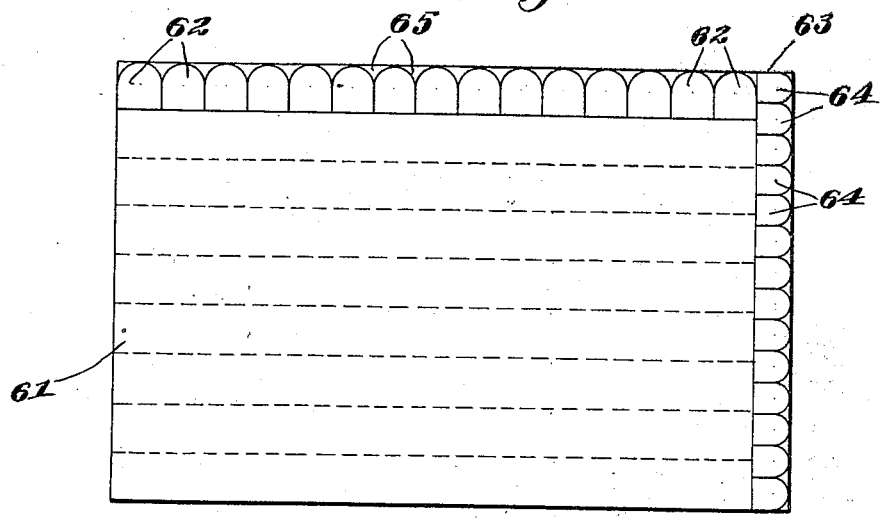
Inventor:
Clarence B. Fuller Jr.
by James R. Hodder
Atty.

Patented Jan. 1, 1924.

1,479,464

UNITED STATES PATENT OFFICE.

CLARENCE B. FULLER, JR., OF BRIDGEWATER, MASSACHUSETTS, ASSIGNOR TO GEO. O. JENKINS COMPANY, OF BRIDGEWATER, MASSACHUSETTS, A CORPORATION OF MASSACHUSETTS.

PROCESS AND APPARATUS FOR BLANKING ARTICLES FROM SHEET MATERIAL.

Application filed June 26, 1922. Serial No. 570,859.

*To all whom it may concern:*

Be it known that I, CLARENCE B. FULLER, Jr., a citizen of the United States, and a resident of Bridgewater, in the county of Plymouth and State of Massachusetts, have invented an Improvement in Processes and Apparatus for Blanking Articles from Sheet Material, of which the following description, in connection with the accompanying drawings, is a specification, like letters on the drawings representing like parts.

My present invention relates to shoes, and more particularly to an improved machine and a novel system or process of blanking articles of leather, leatherboard, fibre, or analogous sheet material used in the manufacture of boots and shoes.

In cutting articles from sheet or strip material such, for example, heel lifts, heel blanks, or the like, it has heretofore been necessary to feed the material from which the blanks are cut past a cutting die and cutting table, the die and table having relative reciprocating movement with respect to each other, and during the feeding of the material, this resulting in the cutting or punching out of the articles conforming to the shape of the die and leaving the sheet or strip of material with a plurality of holes from which the articles have been cut. This prior method necessitated the cutting of the sheet of material into strips of a width suitable for feeding past the dies and cutter, and considerable material was left along the edges of such strips and between the holes made in such strips by the die. No mechanical way of working up this waste material has been devised and the cost of such waste material has been an important factor in determining the cost of the blanked out articles. In my co-pending application, Serial No. 510,467, filed Oct. 26, 1921, I have shown and described an improved form of cutting die which I use in carrying out my present improved novel system or process, and in connection with the improved blanking out machine which, together with the system and process referred to, forms the subject matter of my present invention. I am enabled, by the use of the novel die above referred to, to dispense with the heretofore deemed necessary operation of cutting the sheet material into strips prior to blanking out the articles therefrom and find it possible and advantageous to blank out the articles successively from the complete sheet of material and I may, therefore, depending on the size of the article to be blanked out, measure up accurately a sheet of material to determine the number of articles that may be blanked out therefrom along one edge or end by the use of the improved die referred to, and should the length of such edge or side be slightly greater than the number of articles to be blanked out therefrom, I may cut off the extra length and blank out from this cut off portion a number of articles of smaller area than those measured up, or I may blank out on another machine a number of articles from the excess length, these articles being of necessity smaller in surface area than the articles desired to be blanked out from the main portion of the sheet. It will be apparent, therefore, that I utilize practically every fraction of any size sheet, and the sheet to be fed through the machine containing the die of the size desired, is of an exact length to blank out the articles, there being no waste. In other words, by my improved system and process, the first article to be blanked out, assuming the sheet of material to be fed from right to left through the machine and past the die and block, has for one of its edges the extreme left edge of the sheet of material and the parting line between the right hand edge of such article and the remainder of the sheet of material forms the extreme left hand edge of the next succeeding article. There is, therefore, no waste material between successive articles blanked from a sheet of material according to my improved system and process and the only waste material is that, assuming the article to be blanked is a lift for a shoe heel, the small substantially V shaped portion of material between adjacent articles.

In carrying out my improved system or process, and as an improvement in my machine, I provide a positive material feeding mechanism for moving the material past the cutters step by step, this feed mechanism being operable in synchronism with the reciprocating head of the machine, moving the material forward the required distance and releasing said material to stop the same at the proper instant with the material for the next article to be blanked in position between the die and block. This material feeding means is preferably air controlled by mechanism associated with the reciprocating portion of the machine or I may, if desired, operate such mechanism electrically, the circuit for the control of such means being operated by a circuit closer controlled by the material itself. As the material from which the articles are made may not, and usually do not, come in perfectly flat sheets, it is desirable to provide means for smoothing out any inequalities that may be in such material, as the folds or bends in leather due to warping, and I may provide means for not only positively feeding the material, or pushing it, past the die and block, but may also provide a feeding means that causes a pull on the material and further, in order to provide a tension on the material for straightening out, or flattening, the material, such pulling means or, in my improved machine, the pulling rolls, may be made of larger diameter than the pushing rolls causing material to be stretched between two such sets of rolls as the surface speed of the pulling rolls will be greater than the surface speed of the pushing rolls.

The principal objects of my invention, therefore, are an improved and novel machine for blanking out articles of sheet material, such as leather, leatherboard, rubber, fibre, and the like, and an improved system or process of cutting articles such as heel lifts, heel blanks, or the like, from sheets or strips of material.

My improved system or process is best illustrated in connection with the physical embodiment of my improved machine, and in the accompanying drawings—

Fig. 2 is a plan view;

Fig. 3 is a vertical section through the table of the machine showing the feed roll operating mechanism;

Fig. 4 is a section on the line 4—4 of Fig. 2;

Fig. 5 is a vertical section on the line 5—5 of Fig. 2;

Fig. 6 is a detail illustrating the circuit closing means for synchronizing the roll feeding means with the reciprocating plunger, and Fig. 7 is a layout of a sheet of fabric showing the economical manner of practising my invention for the elimination of waste.

Figure 1:
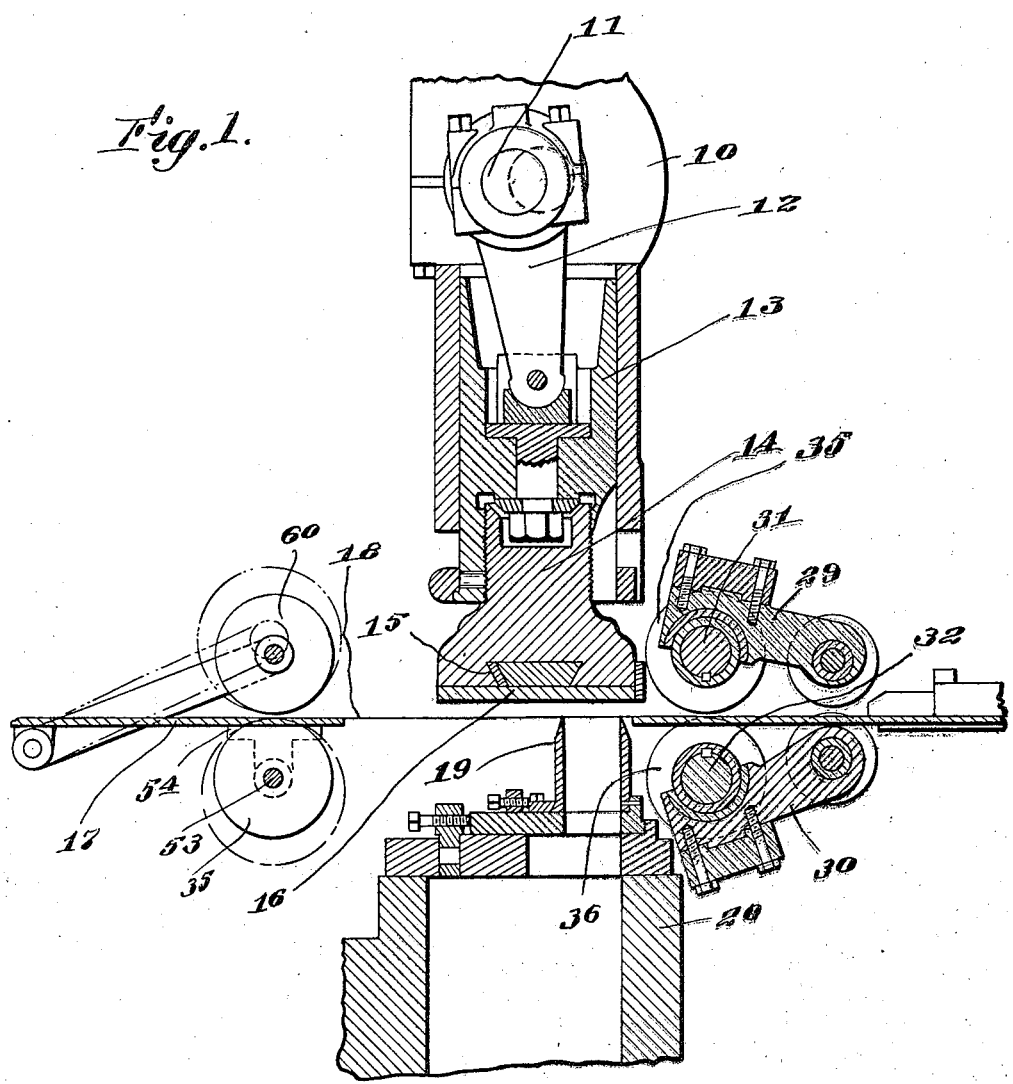
Fig. 1 is a vertical elevation of a portion of my improved machine taken through the center of the reciprocating portion and of the fixed die block.

Referring to the drawings, 10 designates the frame of the machine having rotatably mounted therein a crank shaft 11 on which is rotatably mounted one end of a connecting rod 12, the lower end of this connecting rod being pivotally mounted to a crosshead 13 slidably mounted in the frame 10, and to the lower end of this crosshead 13 is adjustably secured a block holding member 14 the lower end of which is dovetailed at 15 for the reception of a cutting block 16 of suitable size and material. On the frame of the machine is mounted in any suitable manner a work table 17 provided with an opening 18 through which projects the upper or cutting edge of a die 19, this die being of the type illustrated and claimed in my copending application above referred. This die is adjustably mounted on the base 20 formed integral with, and forming a part of, the frame 10 of the machine. On the right side of the machine, as viewed in Figs. 1 and 4, and adjacent the table 17 is a portion of the frame 10 in which is rotatably mounted a shaft 21 having secured thereto a gear 22 driven from the rotating parts of the machine in any suitable manner as is usual. Also mounted in said member 10 and below the shaft 21 are shafts 23 and 24, respectively, the shaft 23 having secured thereon a gear 25 which meshes with, and is driven by, the gear 22 and in turn meshes with, and drives, the gear 26 secured to the shaft 24. Pivotally mounted on the shafts 23 and 24, respectively, and extending to the left or toward the reciprocating member 14 are members 29 and 30, respectively, and in bearings on the inner surface of these two latter members are rotatably mounted one end of shafts 31 and 32, respectively, the other ends of these shafts being located in slots 33 and 34, respectively, in the frame 10. On these shafts are fixed feed rolls 35 and 36, respectively, and pivotally mounted on said shafts respectively, are links 37 and 38, the other ends of these links being pivotally attached to a pin 39 to which pin is also pivotally attached one end of a piston rod 40, the other end of such rod having attached thereto a piston 41 which works in a cylinder 42 that is secured to the member 10 in any suitable manner. By connecting the cylinder 42 to any suitable source of air or other fluid supply, and controlling the admission of such air or fluid to either end of the piston 41, the rolls 35 and 36 may be moved toward and from each other at will, and I so connect such cylinder to an operating portion of the reciprocating crosshead 13 as to have the piston, and therefore the feed rolls 35 and 36, operate in synchronism with such reciprocating crosshead. As, however, the details of the structure of such connecting mechanism do not affect the present invention, they have not been shown and will not be further described, as an electrical or other operating device can be utilized if desired.

Secured to the shafts 31 and 32 are gears 43 and 44, respectively, which mesh with, and are driven by, the gears 25 and 26, respectively. The gears 25 and 26 and 43 and 44 are equal in diameter and pitch, and therefore the feed rolls 27, 28, 35, and 36, which are also equal in diameter, are driven at the same surface speed and in the same direction. In their operative position the feed rolls 28 and 36 extend slightly above the upper surface of the table 17.

The shaft 24 extends forwardly, or toward the operator of the machine, beneath the table 17 and has a bearing in the bracket 45 secured to the end face of the table 17. Secured to the said shaft 24 and near the end thereof adjacent the bearing 45 is a spiral gear 46 which meshes with, and drives, a corresponding spiral gear 47 secured to the shaft 48. This shaft 48 is rotatably mounted at each end in bearing members 49 and 50, secured in any convenient manner to the end face of the table 17 and extends parallel to the table and at right angles to the shaft 24. Secured to the shaft 48 and adjacent the bearing 30 is a spiral gear 51 similar in pitch and diameter to the spiral gear 47, and this spiral gear 51 meshes with, and drives, a corresponding spiral gear 52 secured to a shaft 53 rotatably mounted in bearings 54 secured to the end face of the table 17, this shaft 54 lying parallel to the shaft 24. Secured to the shaft 53 is a pulling feed roll 55, the surface of which extends slightly above the upper face of the table 17. Secured to the end face of the table 17 are bearings 56 in which is rotatably mounted a shaft 57 having secured at one end a link or arm 58 which normally extends in a general upward direction and has secured to its outer or free end a shaft 59 on which is rotatably mounted a pulling feed wheel 60. Secured to said shaft 57 intermediate itself, is a link 161 to the free end of which is pivotally attached a piston rod 162 which works in a cylinder 163 that is pivotally attached to a portion of the bearing 50, the admission of air to said cylinder and the piston enclosed therein being controlled in synchronism with the reciprocating member 13, as in the case of the cylinder 42. The feed wheels 55 and 60 are equal in diameter and may be equal in diameter to the diameter of the feed wheels 35 and 36 in which case the material will be positively fed, but will not be put under tension. I may, however, should I so desire, have said feed wheels 55 and 60 equal in diameter, but of a greater diameter than the feed wheels 35 and 36, as indicated in dotted lines in which case the material fed will be put under tension because of the greater surface speed of the feed wheels 55 and 60 as compared with the surface speed of the feed wheels 35 and 36. The spiral gears 46, 47, 51 and 52 are of such a diameter and pitch with relation to the gears 25, 26, 43, and 44 that the feed wheels 35, 36, 55, and 60, assuming the said feed wheels to be equal in diameter, will rotate at the same surface speed.

Referring now to Fig. 7, 61 designates a sheet of material which may be of leather, leatherboard, fibre, or other suitable material, and that it is desired to blank out therefrom heel lifts 62 of any certain or desired size. Departing from the usual custom of cutting such sheet 61 into strips, as indicated in the dotted lines, I measure up the length of one edge of such sheet, as the upper edge, and assume that the sheet is found to be too long to blank out such desired heel lift 62 without wasting a strip 63 of fairly substantial width. As, however, the strip 63 will ordinarily be found to be wide enough to blank out therefrom a plurality of heel lifts 64 of a size or sizes smaller than the heel lift 62, I may first blank out from the edge 63 the heel blanks 64 on a machine set up to blank out such size, leaving therefor a sheet 61 of a length to blank out a plurality of heel lifts 62 along its edge without waste of material other than the substantially V shaped sections 65 between adjacent heel lifts and of a width to blank out a plurality of rows of such heel lifts.

Assuming that a sheet of material 61 is measured up and laid out in a manner, above indicated, and that the control mechanism on the machine is adjusted to control admission of air or other fluid to the cylinders 42 and 163 to cause a movement of the shafts 31 and 32 toward and from each other at the proper time, and a movement of the feed roll 60 toward and from the feed roll 55 in synchronism therewith and with the reciprocating member 13 the sheet of material is fed between the feed rolls 35 and 36 until its extreme left hand edge is in alinement with the right hand edge of the cutting die 19. The machine is automatically started in operation, by the stock reaching the lever 76, the feed rolls 35 and 36 pushing the sheet of material 61 to the left, as shown in Fig. 1, until extreme left hand edge of such sheet of material is in alinement with the left hand edge of the cutting die 19 whereupon the piston 41 is operated to separate the feed rolls 35 and 36 and stopping the material in position to blank out the first heel lift 62. Upon retraction of the reciprocating member 13, the feed rolls 35 and 36 are automatically operated into contact with the upper and lower surface of the sheet of material, respectively, to feed forward another length of material, this successive feeding of the material taking place until the entire length of material has been fed through. When the left hand edge of the material comes into engagement with the feed rolls 55 and 60, these feed rolls act as positive feeding devices for the material so that when the right hand edge of the material has been fed past the feed rolls 35 and 36, the material will still positively be fed by the feed rolls 55 and 60. With my improved machine, therefore, and by means of my improved system or process, I am enabled to repeat the cycle of operations above described as long as a width of material remains sufficient to blank heel lifts 62, therefrom, and another important advantage of my invention resides in the fact that the work is always in sight, and any derangement or injury of the die or cutting block, or failure on the part of the feed rolls to operate is immediately noticed. In place of the cylinders 42 and 43 and associated mechanism I may substitute electro-magnetic mechanism, a great point in the circuit of such mechanism being at the contacts 75, one of such contacts being secured to the lower face of a lever 76 pivoted intermediate its ends and beneath the table 17. One end of this lever 66 extends through an opening 77 in the table 17 and into the path of movement of the sheet of material 61. To the other end of this lever 76 is secured one end of a coil spring 78, the other end of this coil spring being secured to a bracket 79 attached to the lower face of the table 17.

Having thus described my invention, what I claim as new is:

1. An improved system or process for blanking articles from sheet material which consists in first measuring the sheet of material to a length equal to the sum of the lengths of a plurality of the articles to be blanked, trimming off said sheet to such length to eliminate waste of material, feeding said sheet step by step past a relatively reciprocating block and die to blank out therefrom the measured plurality of articles and without waste of material.

2. In an improved machine for blanking out a plurality of articles from a sheet of material, the combination of a relatively reciprocating block and die, a plurality of feeding rolls located at one side thereof, and means for bringing said rolls into engagement with the sheet of material to feed the same past the die and block, and means operating in synchronism with the reciprocating members for moving said feeding rolls out of engagement with the sheet of material when a predetermined portion of such sheet of material has been positioned in the path of movement of such reciprocating members.

3. In an improved machine for blanking out a plurality of articles from a sheet of material, the combination of a relatively reciprocating block and die, a plurality of feeding rolls located at one side thereof, means for feeding the sheet of material by a pushing movement intermittently into the path of movement of the reciprocating members, means for moving said feeding rolls into engagement with the sheet of material after the same has passed the reciprocating members, and means for releasing said feeding rolls from the sheet of material when a new portion of the sheet of material has been positioned in the path of movement of such reciprocating members.

4. In an improved machine for blanking out a plurality of articles successively from a sheet of material, the combination of a relatively reciprocating block and die, feed rolls located at one side of said reciprocating members for intermittently gripping and releasing and feeding the sheet of material step by step past the block and die, a pair of feed rolls located on the other side of said block and die, means for operating said last named feed rolls to alternately grip and release and feed the sheet of material with a pulling action past the block and die, and means for operating said sets of rolls in synchronism with the reciprocating members.

In testimony whereof, I have signed my name to this specification.

CLARENCE B. FULLER, Jr.